United States Patent
Takahashi (10) Patent No.: US 10,960,586 B2
(45) Date of Patent: Mar. 30, 2021

(54) PROCESS FOR PRODUCING A PLATE ASSEMBLY COMPRISING A RESIN FRAME AND A DECORATIVE MOLDING

(71) Applicant: AGC Inc., Tokyo (JP)

(72) Inventor: Kazuhiro Takahashi, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 16/422,452

(22) Filed: May 24, 2019

(65) Prior Publication Data

US 2019/0366604 A1 Dec. 5, 2019

(30) Foreign Application Priority Data

Jun. 5, 2018 (JP) .............................. JP2018-107937

(51) Int. Cl.
| | |
|---|---|
| *B29C 45/14* | (2006.01) |
| *B60J 10/70* | (2016.01) |
| *B60J 10/00* | (2016.01) |
| B29L 31/30 | (2006.01) |
| B29K 705/00 | (2006.01) |

(52) U.S. Cl.
CPC .... *B29C 45/14467* (2013.01); *B29C 45/1418* (2013.01); *B60J 10/45* (2016.02); *B60J 10/70* (2016.02); *B29C 2045/1454* (2013.01); *B29C 2045/14532* (2013.01); *B29K 2705/00* (2013.01); *B29L 2031/3002* (2013.01)

(58) Field of Classification Search
None
See application file for complete search history.

(56) References Cited

U.S. PATENT DOCUMENTS

| | | | | |
|---|---|---|---|---|
| 4,366,609 | A * | 1/1983 | Speer | B29C 45/1418 264/266 |
| 7,297,081 | B2 * | 11/2007 | Eck | B29C 45/1418 474/161 |
| 8,360,499 | B2 * | 1/2013 | Hasegawa | C09D 5/4465 296/84.1 |
| 2010/0136348 | A1 * | 6/2010 | Nakata | B60J 10/265 428/426 |

(Continued)

FOREIGN PATENT DOCUMENTS

| | | | |
|---|---|---|---|
| JP | 63283917 | * | 11/1988 |
| JP | 03019817 | * | 1/1991 |

(Continued)

*Primary Examiner* — Edmund H Lee
(74) *Attorney, Agent, or Firm* — Foley & Lardner LLP (57) ABSTRACT

A process for producing a plate-like body with a resin frame having a decorative molding, wherein the decorative molding includes a main part and a film formed on a surface and has a design part exposed on a surface of the resin frame and an embedded part in the resin frame. The film continuously covers the design part and the embedded part. The process includes a step of mounting the decorative molding on a mold for forming the resin frame and further mounting a plate-like body, and a step of injecting a molten resin into a cavity of the mold and forming a resin frame with the decorative molding thereon into a window glass while a film at a portion located at a boundary between the design part and the embedded part is pressed against the mold by an injection pressure of the molten resin and thermally deformed.

7 Claims, 6 Drawing Sheets

(56) References Cited

U.S. PATENT DOCUMENTS

2010/0247951 A1\* 9/2010 Fukushima ............ B60J 10/265
　　　　　　　　　　　　　　　　　　　　428/623

FOREIGN PATENT DOCUMENTS

| JP | 200325837 | \* | 1/2003 |
| JP | 2008-270021 A | | 11/2008 |
| JP | 2010-215134 A | | 9/2010 |

\* cited by examiner

PROCESS FOR PRODUCING A PLATE ASSEMBLY COMPRISING A RESIN FRAME AND A DECORATIVE MOLDING

CROSS-REFERENCE TO RELATED PATENT APPLICATION

The present application is based on and claims priority under 35 U.S.C. § 119 of Japanese Patent Application No. 2018-107937, filed on Jun. 5, 2018. The content of the application is incorporated herein by reference in its entirety.

TECHNICAL FIELD

The present invention relates to a process for producing a plate-like body with a resin frame having a decorative molding provided on the resin frame, and a plate-like body with a resin frame.

BACKGROUND ART

Among plate-like bodies for a window of a vehicle, particularly a plate-like body for a window of an automobile, for example, a window glass such as a windshield, a side glass or a rear glass, has a resin frame filling a space between the window glass and an opening for a window of a vehicle integrally provided on a peripheral edge area in many cases. By this resin frame, the window glass is fixed to the opening for a window of a vehicle and the opening for a window of a vehicle is sealed, and in addition, the design of the outer appearance of the window glass is to be improved.

The resin frame is integrally formed on a window glass, for example, by applying a primer (adhesive) to a peripheral edge area of the window glass and attaching the resin frame to a mold, and injecting a molten resin into a cavity space of the mold, whereby a plate-like body with a resin frame having the resin frame integrally formed on a peripheral edge area of a window glass is produced. The present applicant discloses in Patent Document 1 and the like a plate-like body with a frame for a window (trade name: MAW (registered trademark: Module Assembly Window) manufactured by AGC Inc.).

Further, on the surface of a resin frame which is visually recognizable from the outside (hereinafter sometimes referred to as "design surface"), a decorative molding made of a metal or a resin may be provided for the purpose of decorating or reinforcing the resin frame in some cases. The decorative molding has a continuous or frame-like shape produced by press molding or extrusion, and is provided along the surface of the resin frame.

Patent Document 2 discloses a technique to integrally form a resin frame and a decorative molding on a peripheral edge area of a window glass by disposing the decorative molding in a cavity space of a mold for the resin frame and injecting a vinyl chloride molten resin into the cavity space.

Further, the decorative molding in Patent Document 2 is constituted by attaching a film including a resin such as a polyvinyl chloride resin to a shape portion constituting a main part of the decorative molding.

In recent years, users have demanded that the color of the decorative molding is the same color (for example, black) as the color of a vehicle or the resin frame or is a different color. Accordingly, the color of the film is changed to meet the requirements. Further, in a case where the decorative molding is produced by a production process as disclosed in Patent Document 2, the decorative molding has a design part exposed to the outside from the surface of the resin frame and an embedded part embedded in the resin frame.

PRIOR ART DOCUMENTS

Patent Documents

Patent Document 1: JP-A-2008-270021
Patent Document 2: JP-A-2010-215134

DISCLOSURE OF INVENTION

Technical Problem

However, the process for producing a plate-like body with a resin frame disclosed in Patent Document 2 has a problem such that a resin flash is generated at a parting at a boundary between the resin frame and the decorative molding.

Such a flash is considered to be generated by infiltration of a molten resin to the design part side from a space between the mold and the decorative molding located at the parting. A flash may cause a decrease in the quality of the plate-like body with a resin frame. Accordingly, if a flash is generated, a step of removing the flash is required after the step of forming a resin frame, and the steps for producing the plate-like body with a resin frame unnecessarily increase, and further, by removal of the flash, the parting at a boundary between the resin frame and the decorative molding may be scarred, thus remarkably lowering the yield.

Under these circumstances, the present invention has been made to overcome such problems, and its object is to provide a process for producing a plate-like body with a resin frame, capable of producing a plate-like body with a resin frame without generating a resin flash at a parting at a boundary between the resin frame and the decorative molding, and a plate-like body with a resin frame.

Solution to Problem

To achieve the object of the present invention, the process for producing a plate-like body with a resin frame of the present invention is a process for producing a plate-like body with a resin frame having a decorative molding provided on the resin frame of the plate-like body with a resin frame, wherein the decorative molding includes a main part and a film formed on a surface of the main part and has a design part exposed on a surface of the resin frame and an embedded part embedded in the resin frame, and the film is disposed so as to continuously cover the design part and the embedded part, the process including
  a mounting step of mounting the decorative molding on a mold for forming the resin frame and further mounting a plate-like body on the mold, and
  a resin frame-forming step of injecting a molten resin into a cavity space of the mold and forming a resin frame having the decorative molding mounted thereon on the plate-like body while a portion located at a boundary between the design part and the embedded part of the film is pressed against the mold by an injection pressure of the molten resin and thermally deformed.

The plate-like body with a resin frame of the present invention is a plate-like body with a resin frame having a decorative molding provided on the resin frame of the plate-like body with a resin frame,
  wherein the decorative molding includes a main part and a film formed on a surface of the main part, and has a design part exposed on a surface of the resin frame and an embedded part embedded in the resin frame, and the film is disposed so as to continuously cover the design part and the embedded part, and at least a part of the film at a portion located at a boundary between the design part and the embedded part of the film has a thickness of at least 10% and at most 90% of the thickness of the film at the other portion.

Advantageous Effects of Invention

According to the present invention, it is possible to produce a plate-like body with a resin frame without generating a resin flash at a parting at a boundary between a resin frame and a decorative molding.

DESCRIPTION OF EMBODIMENTS

Now, embodiments of the process for producing a plate-like body with a resin frame and the plate-like body with a resin frame of the present invention will be described with reference to the accompanying drawings.

Figure 1:
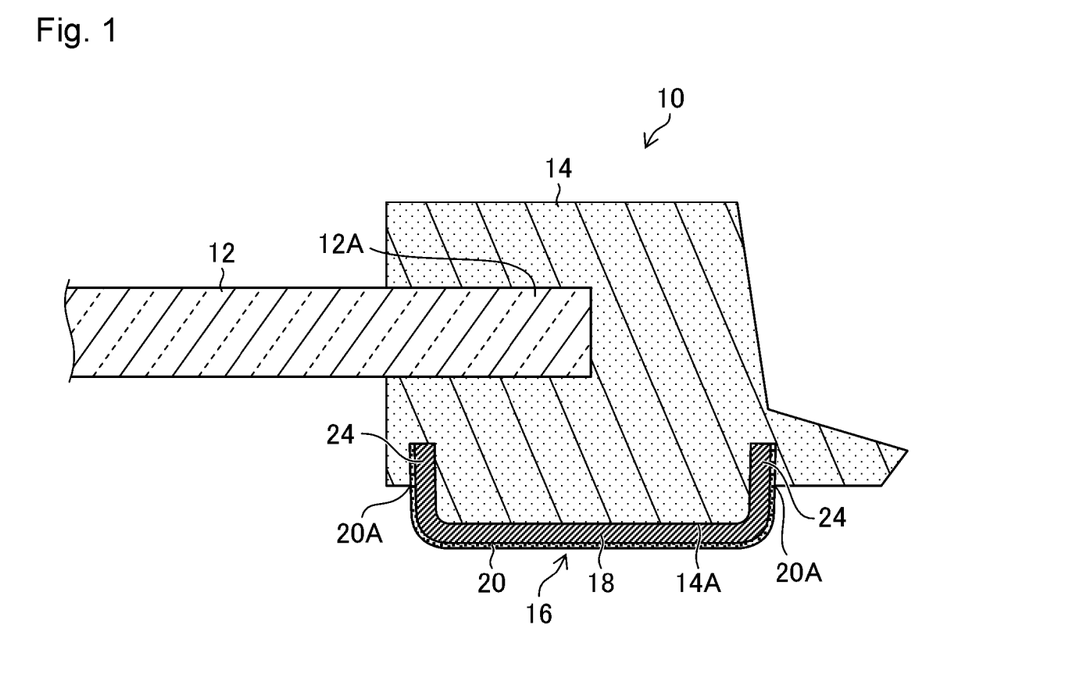
FIG. 1 is a cross-sectional view illustrating a peripheral edge area of a window glass with a resin frame.

FIG. 1 is an enlarged cross-sectional view illustrating a peripheral edge area of a plate-like body with a resin frame (hereinafter referred to as a "window glass with a resin frame") 10 produced by the process for producing a plate-like body with a resin frame according to the present invention. In FIG. 1, the window glass 10 with a resin frame has a constitution including a window glass 12, a resin frame 14 and a decorative molding 16.

Figure 2:
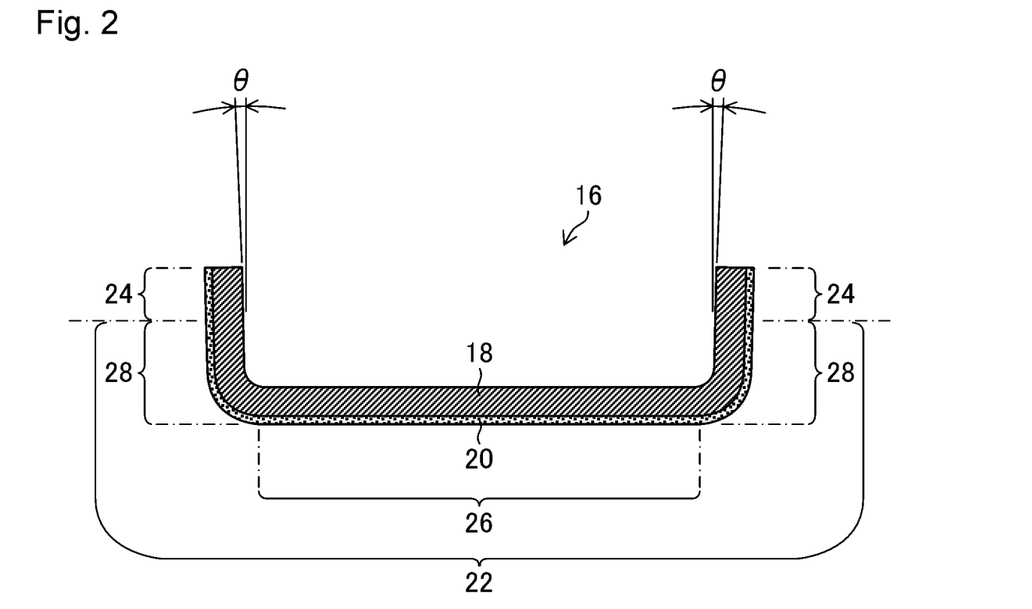
FIG. 2 is an enlarged cross-sectional view illustrating a decorative molding.

FIG. 2 is an enlarged cross-sectional view illustrating the decorative molding 16. The decorative molding 16 is, as shown in FIG. 1, provided on a surface 14A of the resin frame 14 integrally formed on a peripheral edge area 12A of the window glass 12. The surface 14A of the resin frame 14 means a surface which faces the vehicle exterior side when the window glass 10 with a resin frame is fixed to an opening (not shown) for a window of a vehicle.

In FIG. 2, the decorative molding 16 includes a main part 18 the cross section of which is in an approximately U-shape, and a film 20 attached to the surface of the main part 18. By the decorative molding 16 being provided on the surface 14A of the resin frame 14 as shown in FIG. 1, the decorative molding 16 has, as shown in FIG. 2, a design part 22 exposed from the surface 14A of the resin frame 14 and a pair of embedded parts 24, 24 embedded in the resin frame 14. Further, the film 20 is disposed so as to continuously cover the design part 22 and the embedded parts 24, 24. The design part 22 has a flat part 26 and curved connecting parts 28, 28 connecting the flat part 26 and the pair of embedded parts 24, 24. The connecting parts 28, 28 are formed as inclined at a predetermined angle ($\theta°$) to an out-of-plane direction to the flat part 26. By forming the connecting parts 28, 28 as inclined to an out-of-plane direction, a film 20A (see FIG. 1) at a boundary between the design part 22 and the embedded parts 24, 24 can be favorably pressed against a mold by an injection pressure (for example, from 30 MPa to 60 MPa) of a molten resin, at the time of forming the resin frame 14. This will be described hereinafter.

The main part 18 of the decorative molding 16 has, for example, a continuous or frame-like shape as seen in a plan view, and is provided along the surface 14A of the resin frame 14. The main part 18 may be formed by press molding, extrusion or pultrusion using a metal material, or may be formed by extrusion, pultrusion or injection molding using a plastic material. The metal material may, for example, be stainless steel, iron, steel or aluminum. The plastic material may, for example, be a polyethylene resin, a polypropylene resin, an ethylene/vinyl acetate copolymer resin, a polyamide resin, an acrylic resin, a vinylidene chloride resin or a polycarbonate resin.

The film 20 of the decorative molding 16 is, for example, preferably made of a resin. The resin may, for example, be a polyvinyl chloride resin, an acrylic resin, a polyester resin or a polyvinylidene fluoride resin. Further, the film 20 may, for example, include a colored layer and an adhesive layer, or may include such layers and a clear layer. The decorative molding 16 can be made to have a similar color to the color of the resin frame 14 of an automobile body, by the colored layer. The colored layer may be formed by mixing a coloring pigment with a resin. Further, as the above adhesive layer, an adhesive layer of e.g. an acrylic adhesive or an epoxy adhesive may be mentioned. The thickness of the film 20 such constituted is, for example, from 25 μm to 100 μm.

Now, an example of the process for producing a window glass 10 with a resin frame provided with a decorative molding 16 will be described with reference to FIGS. 3 to 8.

The production process according to the present invention roughly includes a mounting step and a resin frame-forming step. In the drawings described hereinafter, in order for easily understandable description of the present invention, the respective members including the decorative molding 16 are enlarged from actual sizes. Further, in FIGS. 4 to 8, a design surface-forming mold 30 and a product rear surface-forming mold 32 are shown, and a resin frame-forming mold 34 is constituted by the design surface-forming mold 30 and the product rear surface-forming mold 32.

Figure 3:
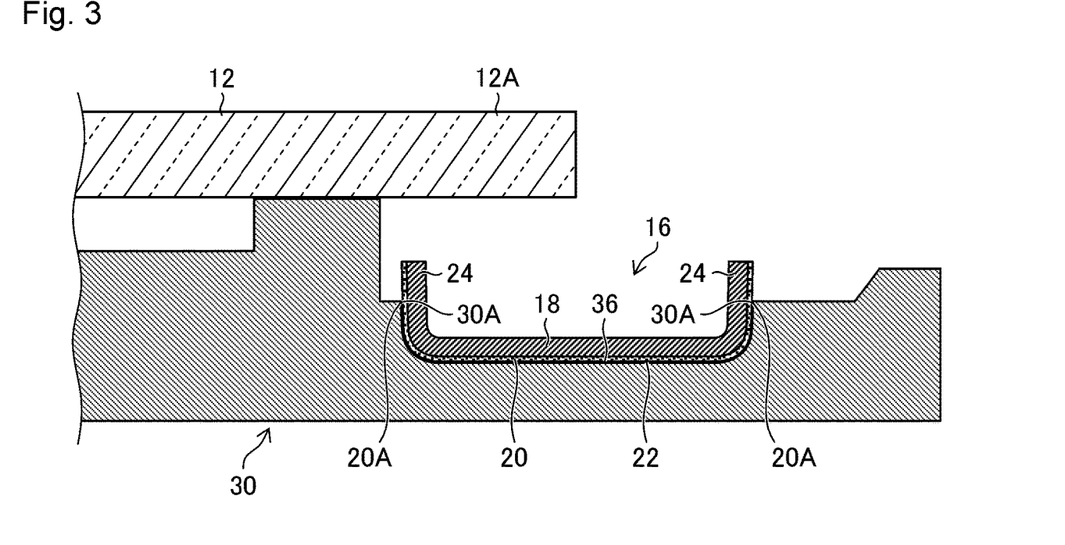
FIG. 3 is a view illustrating a state where a decorative molding is attached to a design surface-forming mold.

First, in the mounting step, as shown in FIG. 3, the design part 22 of the decorative molding 16 is mounted on a recess 36 of the design surface-forming mold 30. The recess 36 is a mounting part exclusive to integral attachment of the decorative molding 16 on the resin frame 14.

Figure 4:
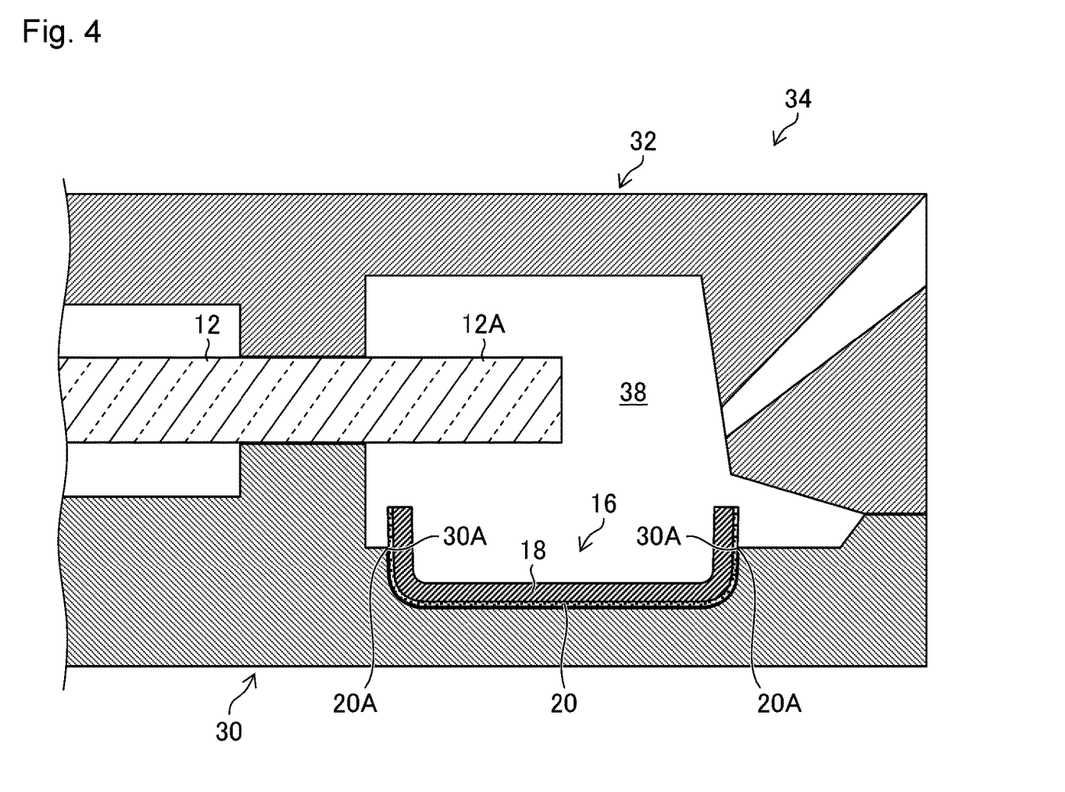
FIG. 4 is a view illustrating a state where a product rear surface-forming mold is fixed to the design surface-forming mold.

Then, the peripheral edge area 12A of the window glass 12 is mounted on a predetermined position of the design surface-forming mold 30. Then, as shown in FIG. 4, the product rear surface-forming mold 32 is fixed to the design surface-forming mold 30, whereby a cavity space 38 is formed between the design surface-forming mold 30 and the product rear surface-forming mold 32, and the decorative molding 16 and the peripheral edge area 12A of the window glass 12 are accommodated in the cavity space 38. By the above procedure, the mounting step is conducted.

Figure 9A:
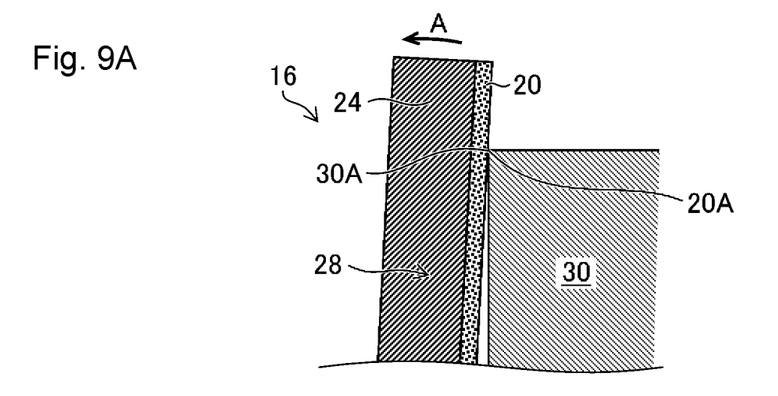
FIGS. 9A, 9B, and 9C are views illustrating a state of plastic deformation of a film of the decorative molding in a time series.

The state of the decorative molding 16 at a point of completion of the mounting step is, as shown in FIG. 9A, such that in the design surface-forming mold 30, the film 20A at a boundary between the design part 22 and the embedded parts 24, 24 is pressed against and brought into contact with a corner part 30A located at a parting at a boundary between the resin frame 14 (see FIG. 1) and the decorative molding 16. This brings the embedded parts 24, 24 into elastic deformation at a predetermined angle to an in-plane direction side represented by the arrow A in FIG. 9A to the flat part 26 (see FIG. 2).

Figure 5:
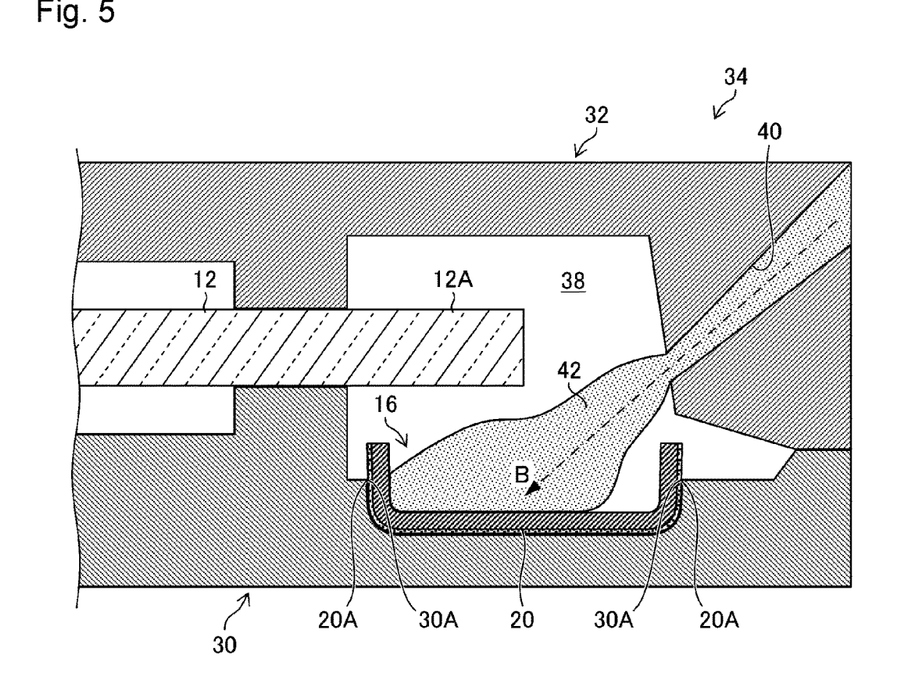
FIG. 5 is a view illustrating a state where a molten resin is injected into a cavity space from a resin inlet.

Then, in the resin frame-forming step, as shown in FIG. 5, a molten resin 42 is injected into the cavity space 38 in the arrow B direction from a resin inlet 40 provided on the product rear surface-forming mold 32.

Figure 6:
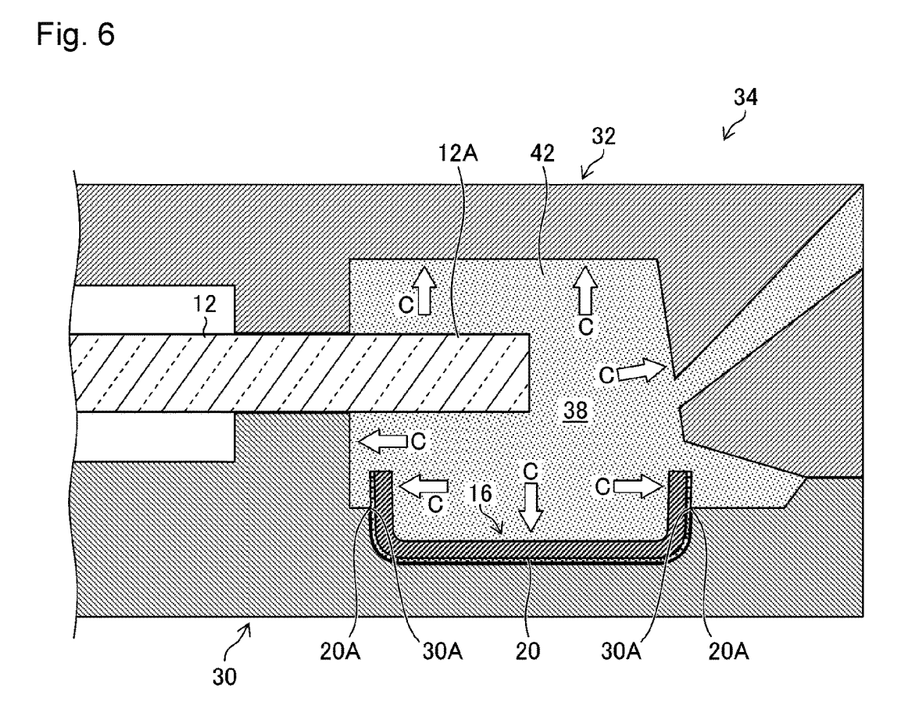
FIG. 6 is a view illustrating a state where the cavity space is being filled with the molten resin.

As an example, the resin inlet 40 is provided toward the recess 36, whereby the molten resin 42 injected from the resin inlet 40 is first injected into an approximately U-shape interior of the decorative molding 16 attached to the recess 36. Then, the molten resin 42 fills the interior and then fills the cavity space 38 out of the decorative molding 16 in order, whereby the cavity space 38 is filled with the molten resin 42, as shown in FIG. 6. The arrows C in FIG. 6 represent flow directions of the molten resin 42 in the cavity space 38. Injection of the molten resin 42 first into the approximately U-shaped interior of the decorative molding 16 is one reason to suppress generation of a flash as described hereinafter.

The resin of the molten resin 42 may, for example, be a thermoplastic resin. The thermoplastic resin may, for example, be a common thermoplastic resin selected from a vinyl chloride resin, and polyolefin, polyester, polystyrene, polyamide and polyurethane elastomers, etc. The resin of the molten resin 42 and the film 20 preferably include similar resins. When the resin of the molten resin 42 and the film 20 include similar resins, the molten resin 42 and the film 20 are more easily bonded at the embedded parts 24, 24.

Figure 7:
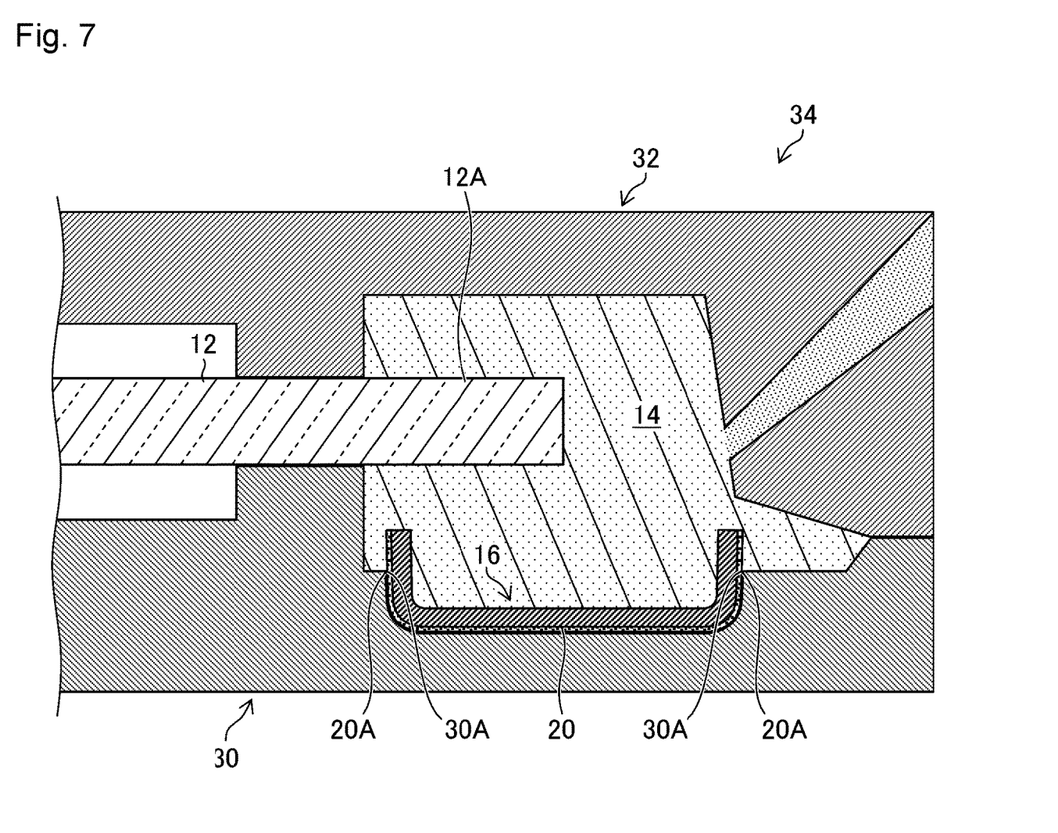
FIG. 7 is a view illustrating a state immediately after a resin frame is integrally formed on a window glass.
Figure 8:
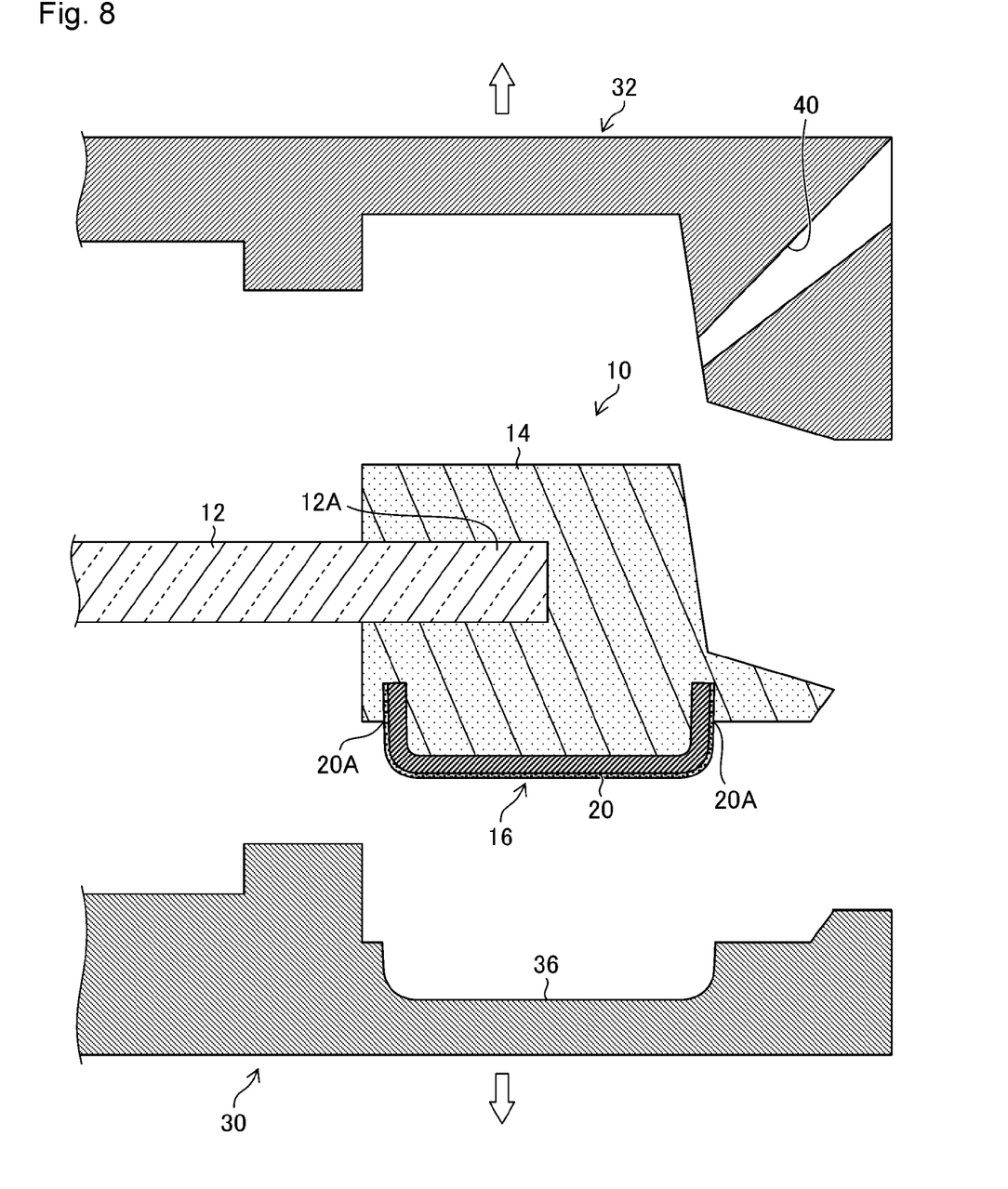
FIG. 8 is a view illustrating a state where the design surface-forming mold and the product rear surface-forming mold are separated from each other.
Figure 9B:
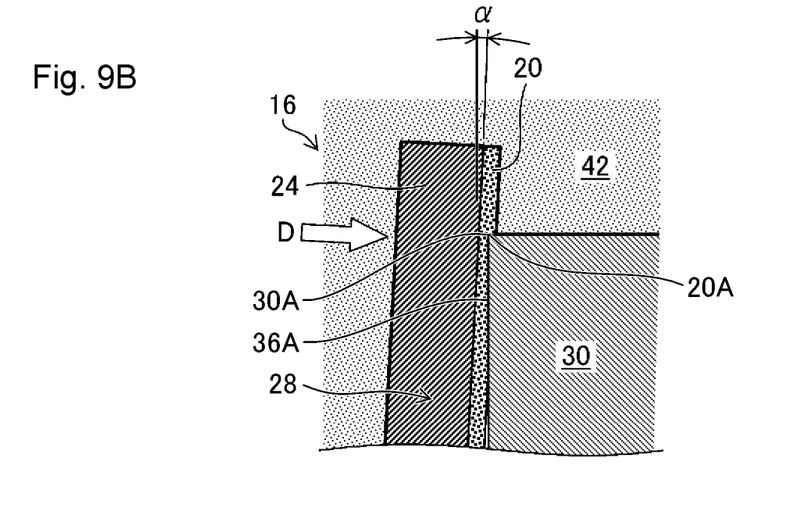

The state of the decorative molding 16 during filling of the molten resin 42 is, as shown in FIG. 9B, such that the film 20A is being pressed against the corner part 30A by the injection pressure represented by the arrow D of the molten resin 42, and a resin frame 14 having the decorative molding 16 provided thereon is being formed at the peripheral edge area 12A of the window glass 12, while a portion located at a boundary between the design part 22 and the embedded parts 24, 24 of the film 20A is being plastically deformed by the corner part 30A. That is, the decorative molding 16 and the resin frame 14 are an integrally formed product. FIG. 7 illustrates a state immediately after the resin frame 14 is integrally formed on the peripheral edge area 12A of the window glass 12. After this, as shown in FIG. 8, the design surface-forming mold 30 and the product rear surface-forming mold 32 are separated from each other to produce the window glass 10 with a resin frame as shown in FIG. 1. By the above procedure, the resin frame-forming step is conducted.

Figure 9C:
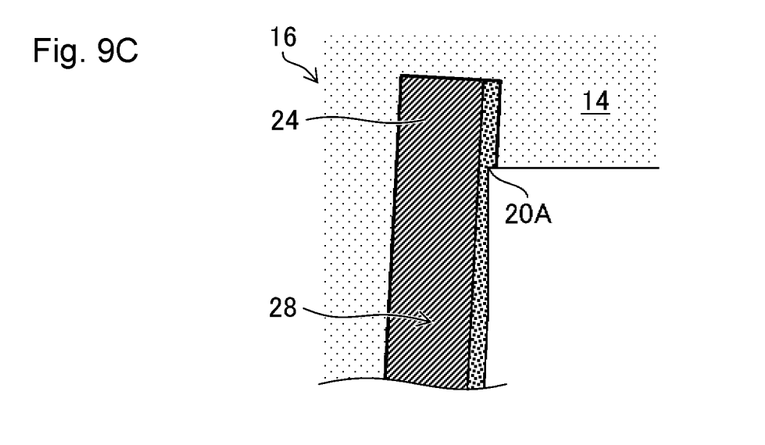

In the window glass 10 with a resin frame produced by the above production process, as shown in FIG. 9C, the film 20A is plastically deformed in a shape having the shape of the corner part 30A (see FIG. 9B) transferred. That is, at the time of filling the molten resin 42 as shown in FIG. 6, a portion located at a boundary between the design part 22 and the embedded parts 24, 24 of the film 20A is being plastically deformed while being pressed against the corner part 30A by the injection pressure (arrow D in FIG. 9B) of the molten resin 42, whereby at the time of filling the molten resin 42, no space forms between the film 20A and the corner part 30A, and infiltration of the molten resin 42 into the recess 36 from the space can be prevented. Accordingly, no resin flash is generated at a parting at a boundary between the resin frame 14 and the decorative molding 16. Thus, according to the process for producing a window glass 10 with a resin frame according to the embodiment, it is possible to produce a window glass 10 with a resin frame without generating a resin flash at a parting at a boundary between the resin frame 14 and the decorative molding 16.

Further, in the resin frame-forming step according to this embodiment, the film 20A is preferably plastically deformed so that its thickness is reduced to half the thickness of the film 20 at the other portion not plastically deformed. By plastically deforming the film 20A into such a thickness, the adhesion between the film 20A and the corner part 30A improves, and formation of a space between the film 20A and the corner part 30A can be securely prevented. Further, a decrease of the design of the outer appearance of the film 20A by plastic deformation can be suppressed.

Further, it is possible to adjust the thickness of the film 20A plastically deformed as pressed against the corner part 30A to at least 10% and at most 90% of the thickness of the film 20, by setting the injection pressure of the molten resin 42 so that the angle α of inclination of the connecting part 28 relative to a wall surface 36A of the recess 36 (see FIG. 3) is, for example, from 0.5° to 3.0°, as shown in FIG. 9B, depending on the thickness of the film 20A. The thickness of the film 20A plastically deformed is preferably at least 20% and at most 80%, more preferably at least 40% and at most 60% of the thickness of the film 20. By adjusting the thickness of the film 20A plastically deformed as pressed against the corner part 30A to at least 10% of the thickness of the film 20, the film at a parting at a boundary between the resin frame 14 and the decorative molding 16 is less likely to be broken. By adjusting the thickness of the film 20A plastically deformed as pressed against the corner part 30A to at most 90% of the thickness of the film 20, a resin flash will hardly be generated at a parting at a boundary between the resin frame 14 and the decorative molding 16.

Still further, if the corner part 30A is acute, it may break the film 20A. Accordingly, in such a case, it is preferably chamfered into a C-chamfer plane or in an R-chamfer plane.

Further, in the above embodiment, as the plate-like body of the plate-like body with a resin frame, a glass plate (window glass) is exemplified, but the plate-like body is not limited to a glass plate, and for example, a transparent or translucent resin plate may also be used.

REFERENCE SYMBOLS

10: window glass with resin frame, 12: window glass, 14: resin frame, 16: decorative molding, 18: main part, 20: film, 20A: film, 22: design part, 24: embedded part, 26: flat part, 28: connecting part, 30: design surface-forming mold, 30A: corner part, 32: product rear surface-forming mold, 34: mold, 36: recess, 38: cavity space, 40: resin inlet, 42: molten resin.

What is claimed is:

1. A process for producing a plate assembly comprising a resin frame and a decorative molding provided on the resin frame,
   wherein the decorative molding comprises a main part, a film formed on a surface of the main part, a design part exposed on a surface of the resin frame, and an embedded part embedded in the resin frame, and wherein the film is disposed so as to continuously cover the design part and the embedded part, the process comprising:
- a mounting step of mounting the decorative molding on a mold for forming the resin frame and further mounting a plate on the mold, and
- a resin frame-forming step of injecting a molten resin into a cavity space of the mold to form the resin frame along a portion of the plate and such that the decorative molding is provided on the resin frame, wherein a first portion of the decorative molding that is located at a boundary between the design part and the embedded part of the film is pressed against the mold by an injection pressure of the molten resin and thermally deformed.

2. The process for producing the plate assembly according to claim 1, wherein, in the resin frame-forming step, at least a part of the film at the first portion of the decorative molding, is plastically deformed so as to have a thickness of at least 10% and at most 90% of the thickness of the film at a second portion of the decorative molding.

3. The process for producing the plate assembly according to claim 1, wherein the design part of the decorative molding has a flat part and a connecting part connecting the flat part and the embedded part, the connecting part is formed as inclined in an out-of-plane direction to the flat part.

4. The process for producing the plate assembly according to claim 1, wherein the main part comprises a metal material.

5. The process for producing the plate assembly according to claim 1, wherein the film comprises at least one resin selected from a polyvinyl chloride resin, an acrylic resin, a polyester resin, and a polyvinylidene fluoride resin.

6. The process for producing the plate assembly according to claim 1, wherein the film has a colored layer and an adhesive layer, and the colored layer has a similar color to the color of the resin frame or a vehicle body.

7. The process for producing the plate assembly according to claim 5, wherein the molten resin and the film comprise similar resins.

* * * * *